United States Patent
Bisio et al.

(10) Patent No.: US 8,726,927 B2
(45) Date of Patent: May 20, 2014

(54) FLUID CONVEYANCE AND/OR DISTRIBUTION DEVICE WITH RING NUT COUPLING

(75) Inventors: Andrea Bisio, Genoa (IT); Corrado Mazzacano, Genoa (IT)

(73) Assignee: F.I.P. Formatura Iniezone Polimeri S.p.A., Casella (IT)

( * ) Notice: Subject to any disclaimer, the term of this patent is extended or adjusted under 35 U.S.C. 154(b) by 199 days.

(21) Appl. No.: 13/291,724

(22) Filed: Nov. 8, 2011

(65) Prior Publication Data
US 2012/0111420 A1 May 10, 2012

(30) Foreign Application Priority Data

Nov. 10, 2010 (EP) .................................... 10425347

(51) Int. Cl.
*F16K 43/00* (2006.01)

(52) U.S. Cl.
USPC ............ 137/315.41; 137/315.18; 251/315.01; 251/315.1

(58) Field of Classification Search
USPC ................. 137/15.08, 15.09, 15.22, 315.18, 137/315.41, 327, 328, 798; 251/142, 149, 251/152, 292, 315.1–315.14; 285/38–39, 285/377, 306
See application file for complete search history.

(56) References Cited

U.S. PATENT DOCUMENTS

| | | | | |
|---|---|---|---|---|
| 977,472 | A * | 12/1910 | Pilkington | 285/39 |
| 2,907,242 | A * | 10/1959 | Chakroff | 81/57.15 |
| 3,137,187 | A * | 6/1964 | Hoose | 81/474 |
| 3,202,175 | A | 8/1965 | Dumm | |
| 4,605,199 | A * | 8/1986 | Bonissone et al. | 251/171 |
| 5,090,447 | A * | 2/1992 | Lewis et al. | 137/559 |
| 7,306,010 | B2 * | 12/2007 | Gruener, Sr. | 137/797 |
| 7,731,153 | B2 * | 6/2010 | Miklo et al. | 251/99 |
| 2008/0236342 | A1 * | 10/2008 | McDaniel | 81/9.24 |
| 2010/0025611 | A1 | 2/2010 | Mazzacano et al. | |

FOREIGN PATENT DOCUMENTS

EP 0 607 770 A1 7/1994

* cited by examiner

*Primary Examiner* — John K Fristoe, Jr.
*Assistant Examiner* — Matthew W Jellett
(74) *Attorney, Agent, or Firm* — Dickstein Shapiro LLP

(57) ABSTRACT

A device for conveying and/or distributing fluids comprises a housing with connection portions, one or more threaded ring nuts which can be screwed to the connection portions for joining them, and a tightening seat formed in the housing. The device further comprises a first adapter with a portion for coupling with the tightening seat, a driving portion for engagement with an engagement portion of the ring nut and a first key seat shaped to receive a portion for coupling a tightening tool.

12 Claims, 7 Drawing Sheets

FLUID CONVEYANCE AND/OR DISTRIBUTION DEVICE WITH RING NUT COUPLING

BACKGROUND OF THE INVENTION

1. Field of the Invention

The present invention refers in general to a fluid conveyance and/or distribution device with ring nut coupling and in particular to a hydraulic valve with ring nut coupling, for example in fluid conveyance and distribution systems.

2. Description of the Related Art

In order to optimise and economise the production of fluid conveyance and distribution systems, for example hydraulic circuits, provided with pipes and valves of various types, for example distribution valves, control valves, exhaust valves, damping valves, delivery valves or selector valves, the valves are integrally produced independent of the piping and connected thereto only when assembling the hydraulic circuit.

During the assembly, for example of a hydraulic circuit, the valves and piping are connected to each other so as to allow the execution of the desired functions.

For such purpose, the valve usually comprises an externally threaded coupling portion and a ring nut with inner threading, adapted to be screwed on the coupling portion in order to maintain one end of a pipe in engagement with this coupling portion.

This type of connection has the disadvantage lying in the fact that both the tightening of the ring nut during assembly and the loosening of the ring nut during maintenance or replacement of the valve require a specific space around the ring nut in order to be able to grasp it with the hand or with a tightening tool. Nevertheless, this need for space for mounting and dismounting the flow control valves and devices in general is difficult to reconcile with the very narrow spaces of the industrial plants, civilian or military, in which the fluid conveyance and distribution systems are integrated. Actually, in most plants, the only freely accessible part of a valve is the control portion thereof, for example a handle for regulating the flow through the valve and it is the same control handle which further blocks access to the coupling ring nuts.

A further disadvantage of the valves of the prior art lies in the poor reproducibility of the tightening torques of the ring nuts most suitable for the ideal operation of the valve. This also applies in the case of tightening the support rings for a sealed positioning of the shutter, for example a ball shutter, inside the valve body. Actually, depending on the application, the maintenance programs for fluid distribution systems provide for the complete dismounting of the valves, cleaning the single components and the subsequent reassembly of the cleaned valves at three-month or yearly maintenance intervals for example.

SUMMARY OF THE INVENTION

The object of the present invention is therefore that of proposing a fluid conveyance and/or distribution device, for example a valve, provided with at least one ring nut coupling portion, having characteristics such to allow the tightening of the ring nut by means of reproducible tightening torque and in limited space conditions.

Such object is achieved by means of a fluid conveyance and/or distribution device, for example a valve, comprising:
a housing forming one or more tubular connection portions removably connectable with corresponding connection portions of a fluid conveyance and/or distribution system, the housing further defining a tightening seat,
one or more threaded ring nuts which can be screwed to respectively one of the connection portions for joining said connection portions,
a first adapter comprising:
a valve coupling portion adapted to be received by the tightening seat in a tightening position and rotatable around a tightening axis,
a driving portion which, in the tightening position, engages with an engagement portion formed in the ring nut, so that a rotation of the first adapter around the tightening axis causes, depending on the direction of rotation, a screwing or unscrewing of the ring nut,
a first key seat adapted to receive a portion for coupling a tightening tool to rotate the first adapter in the tightening position around the tightening axis.

According to an aspect of the invention, the device comprises one or more fastening rings which can be screwed into the tubular connection portions to ensure the positioning of internal components of the device, as well as a second adapter comprising:
a mounting portion adapted to engage a tool seat formed in the fastening ring so that a rotation of the second adapter causes, depending on the direction of rotation, a screwing or unscrewing of the fastening ring,
a second key seat adapted to receive the coupling portion of the tightening tool to rotate the second adapter.

According to a further aspect of the invention, the device comprises a dynamometric key having a coupling portion adapted to rotatably integrally engage said first key seat and said second key seat, as well as a dynamometric control mechanism adjustable to a first torsional value for tightening the ring nut and a second torsional value for tightening the fastening ring.

The adapters allow using a single tightening tool, in particular a dynamometric key, for tightening the ring nuts and also for tightening the fastening rings of the device, for example a ball valve. This allows assembling the device by means of reproducible and verifiable fastening torques.

Furthermore, the object of the invention is achieved by means of a method for assembling a fluid conveyance and/or distribution device of the type comprising a housing forming one or more tubular connection portions removably connectable with corresponding connection portions of a fluid conveyance and/or distribution system, one or more threaded ring nuts which can be screwed to respectively one of the connection portions for joining said connection portions, Wherein the method comprises the steps of:
providing a first adapter having a valve coupling portion, a driving portion adapted to engage an engagement portion formed in the ring nut and a first key seat adapted to receive a portion for coupling the dynamometric key to rotate the first adapter,
rotatably connecting the first adapter by means of the valve coupling portion to a tightening seat of the valve housing,
engaging the first key seat of the first adapter by means of a dynamometric key and rotating the dynamometric key for screwing the ring nut,
verifying the tightening torque during the screwing of the ring nut by means of the dynamometric key.

According to an aspect of the invention, the method comprises the steps of:
ensuring the positioning of internal components of the device by means of screwing at least one fastening ring into the tubular connection portions,
providing a second adapter having a mounting portion adapted to engage a tool seat formed in the fastening ring and a second key seat adapted to receive a portion for coupling the dynamometric key, applying the second adapter by means of the mounting portion to the tool seat of the fastening ring, engaging the second key seat of the second adapter by means of the dynamometric key and rotating the dynamometric key to tighten the fastening ring, verifying the tightening torque during the tightening of the fastening ring by means of the dynamometric key.

BRIEF DESCRIPTION OF THE DRAWINGS

In order to better comprehend the invention and appreciate the advantages thereof, some exemplifying and non-limiting embodiments are described below, with reference to the attached drawings, wherein.

DETAILED DESCRIPTION OF THE PREFERRED EMBODIMENTS

Figure 1:
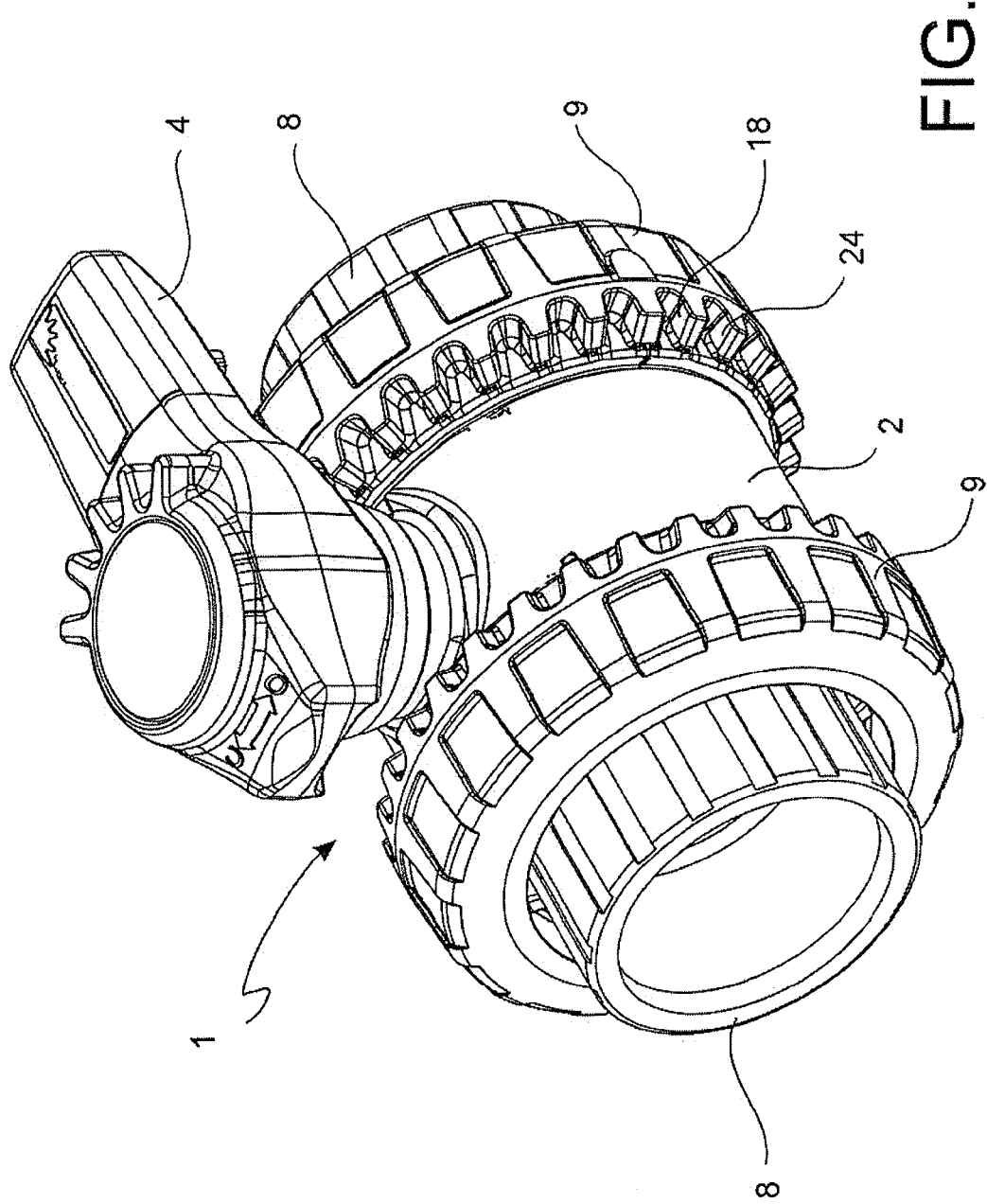
FIG. 1 is a perspective view of a device according to an embodiment of the invention.
Figure 2:
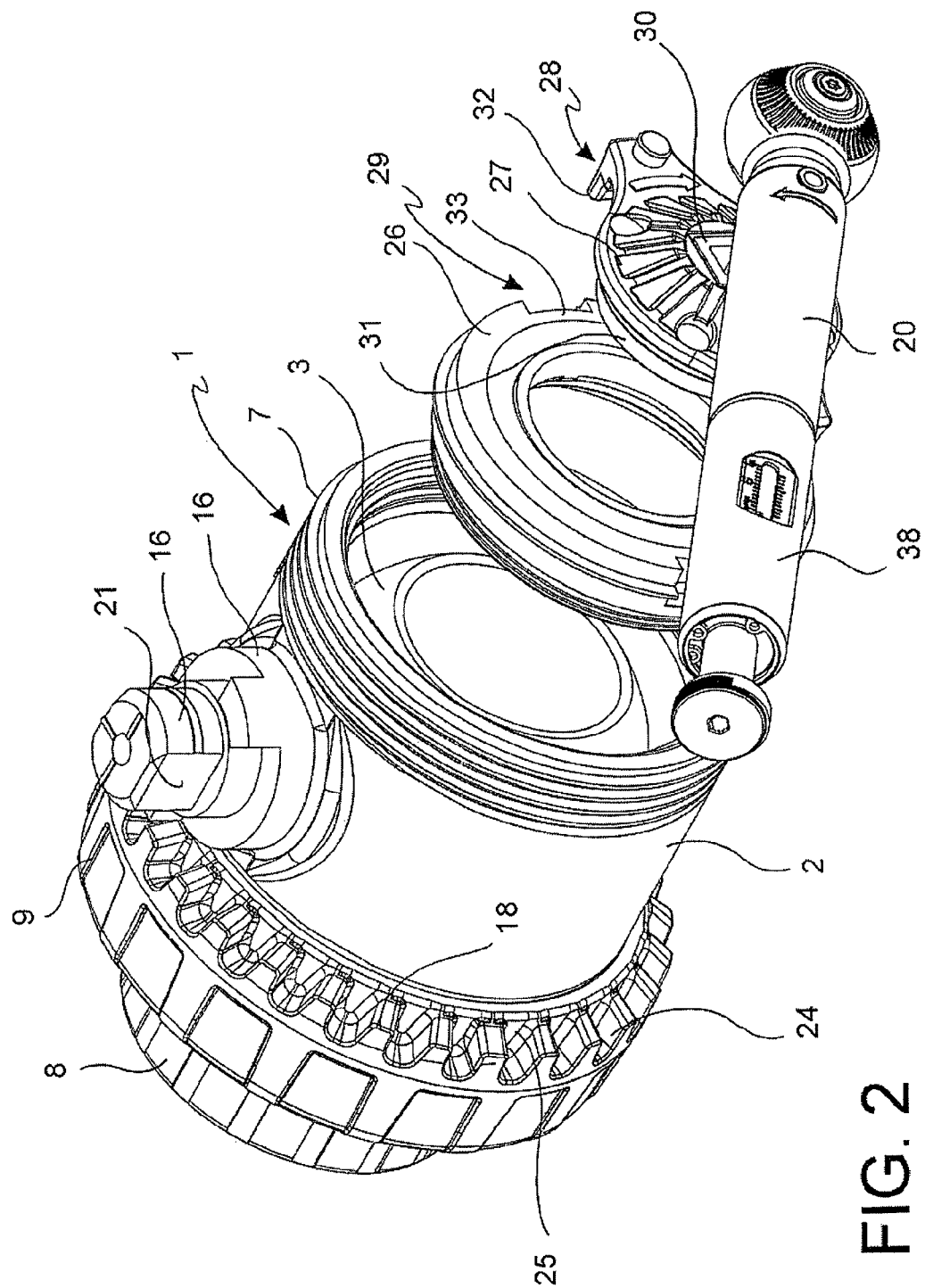
FIG. 2 is an exploded view of the device in FIG. 1 with an adapter and a dynamometric key.
Figure 3:
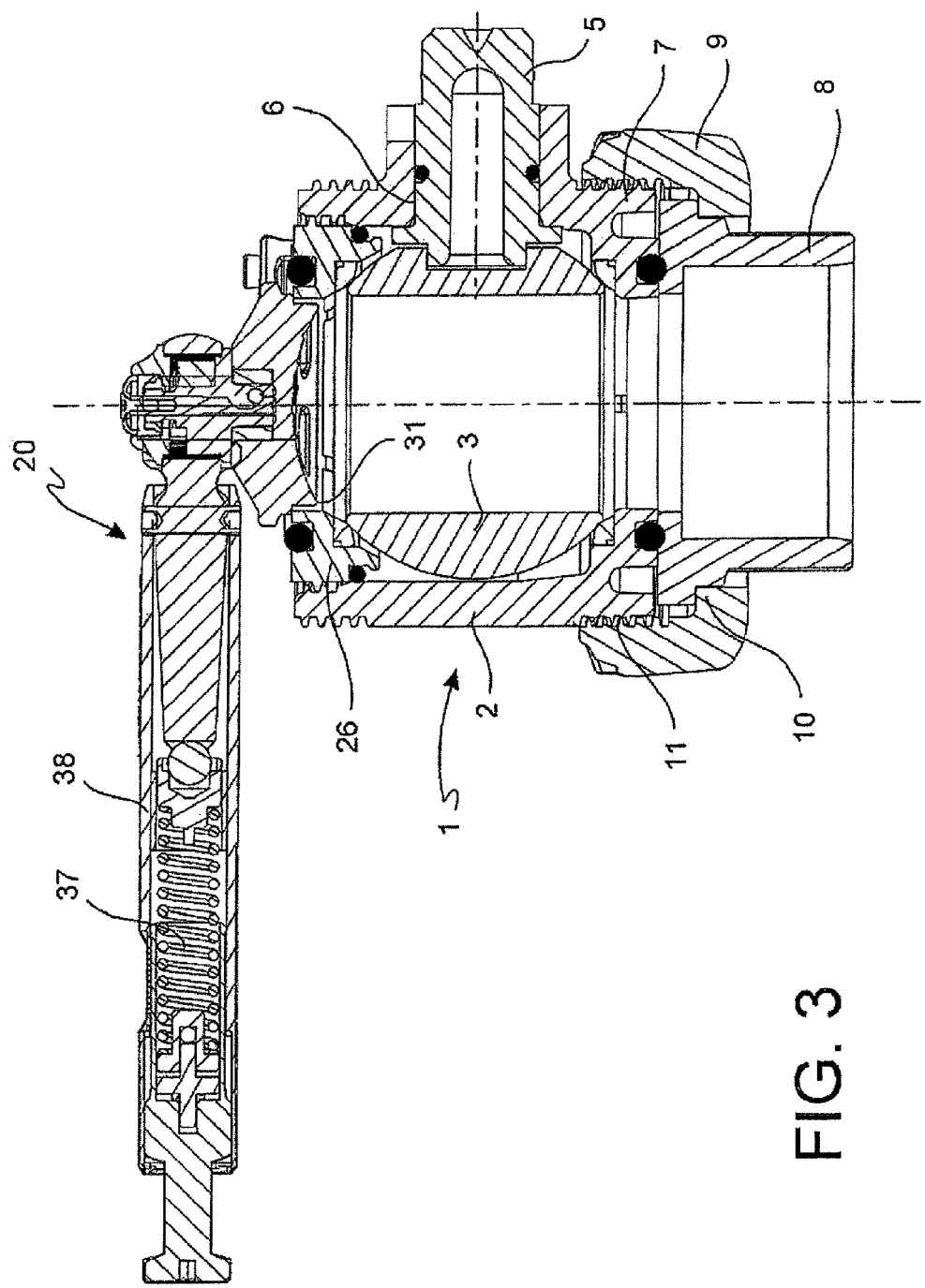
FIG. 3 is a view of the device in longitudinal section during the screwing of a fastening ring.
Figure 4:
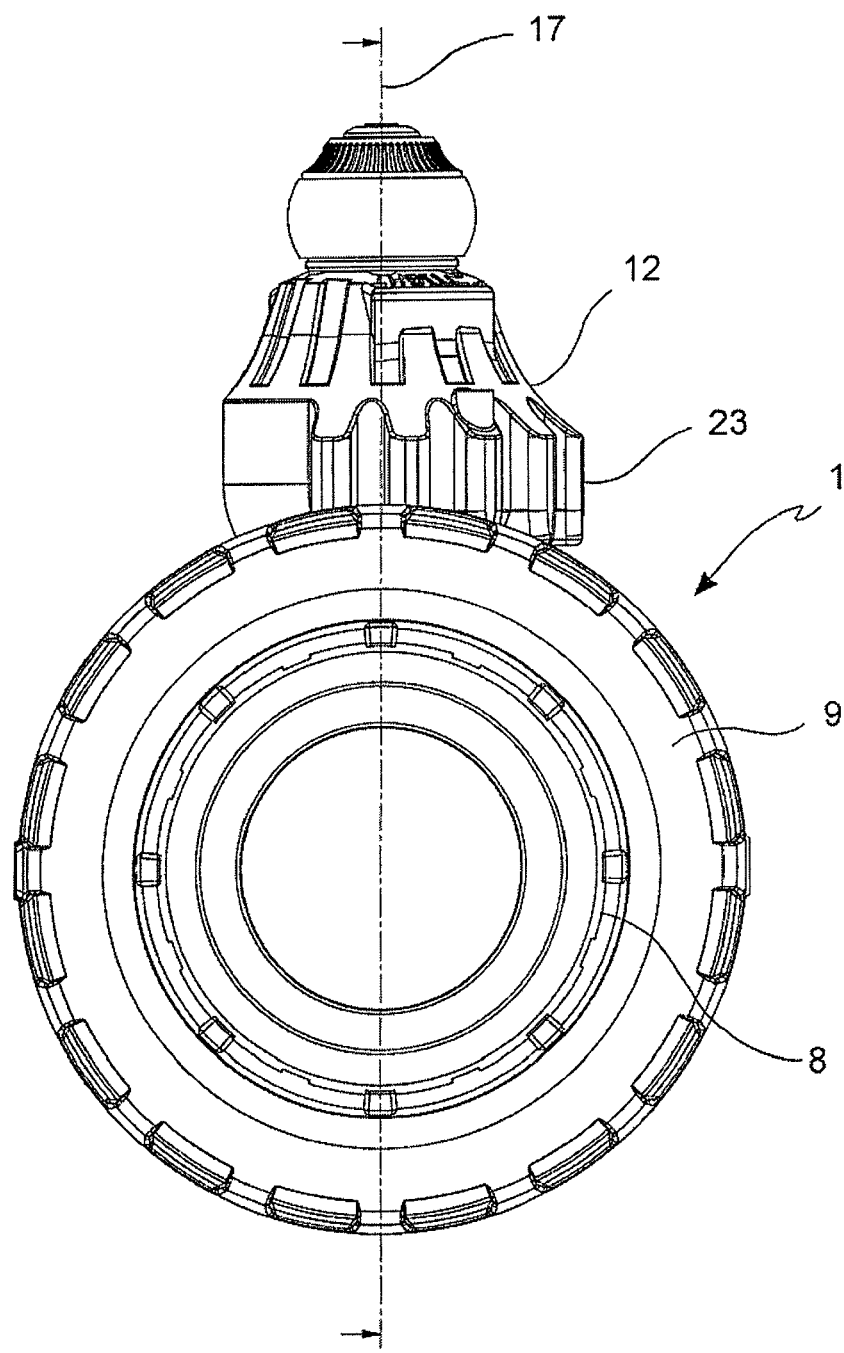
FIG. 4 is a side view of the device during the tightening of a ring nut.
Figure 5:
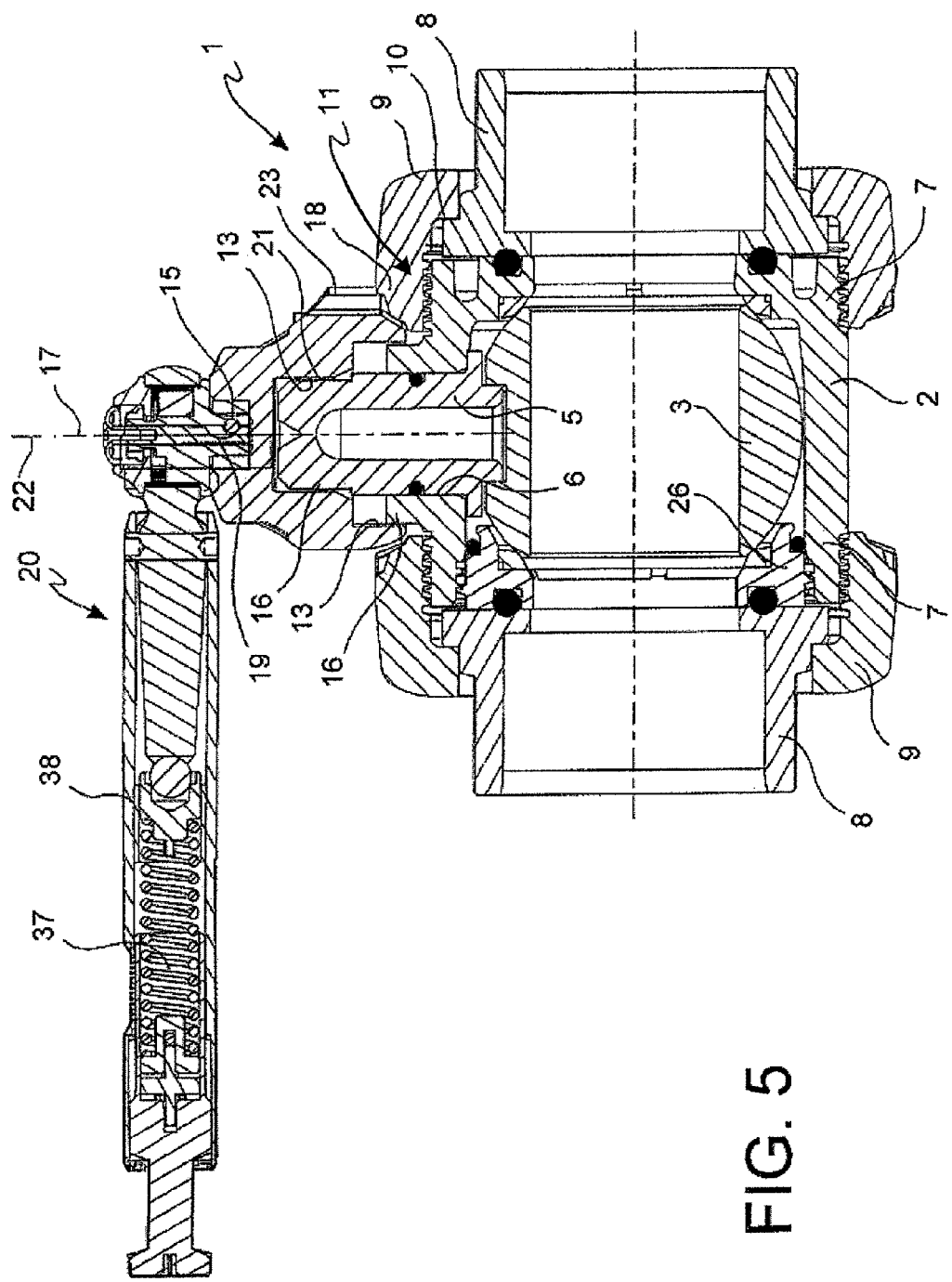
FIG. 5 is a view in longitudinal section of the device in FIG. 4.
Figure 6:
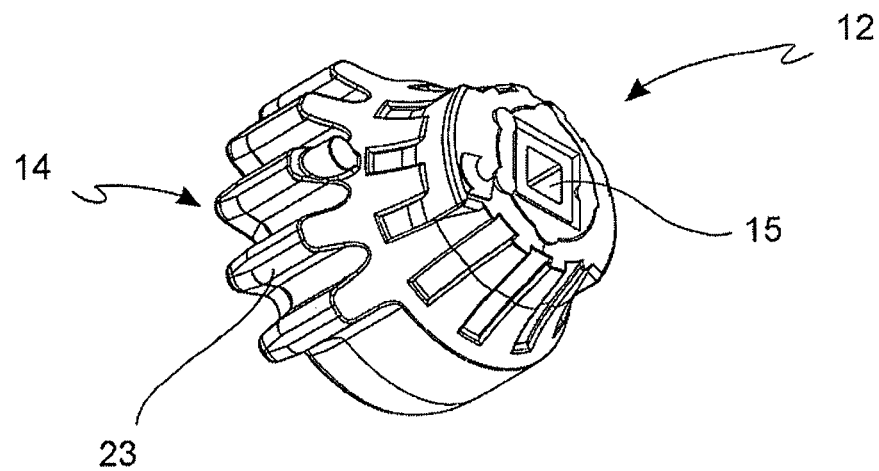
FIGS. 6 and 7 are perspective views of a first adapter of the device according to an embodiment.
Figure 7:
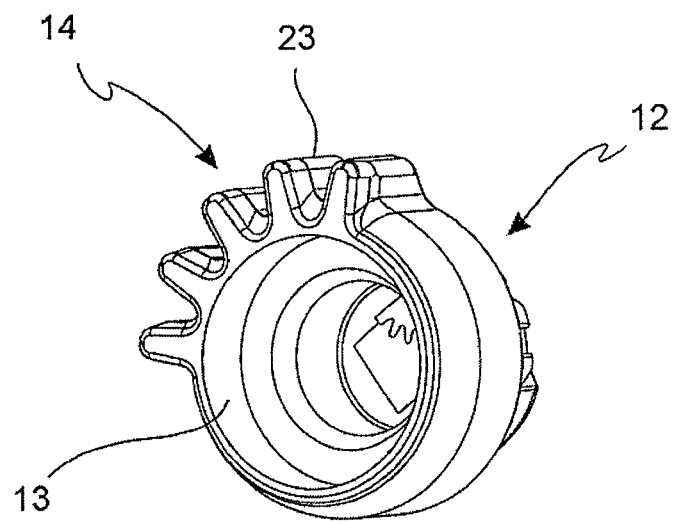
Figure 8:
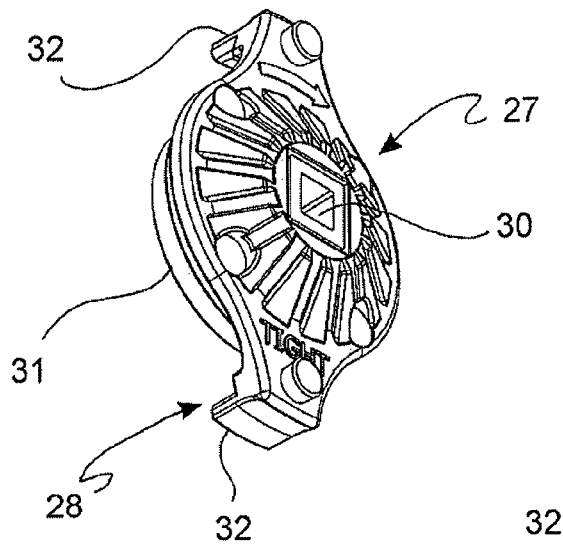
FIGS. 8 and 9 are perspective views of a second adapter of the device according to an embodiment.
Figure 9:
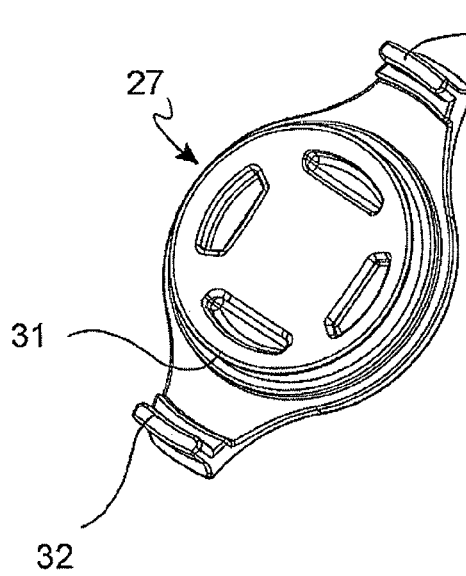
Figure 10:
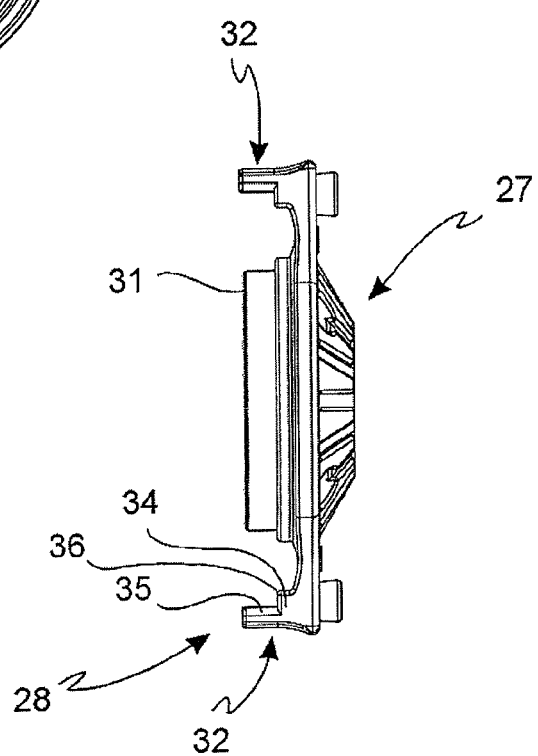
FIG. 10 is a side view of the second adapter of FIG. 8.

With reference to the figures, a fluid conveyance and/or distribution device, for example a valve, is indicated in its entirety with reference 1. By way of non-limiting example, such valve may comprise a valve body or housing 2, a shutter 3 arranged inside the valve body 2, a control handle 4 rotatably connectable to a support portion or "tower" of the housing 2 and adapted to position the shutter 3 by means of an actuation shaft 5 arranged in a special passage 6 of the housing 2. The shutter 3, depending on the operative position thereof, affects (for example regulates, blocks, divides or distributes) a fluid flow, for example a liquid traversing the valve or more generally the device 1.

According to the general concept of the invention, the device 1 comprises a housing 2 with a tightening seat 16 and one or more tubular connection portions 7 and removably connectable with corresponding connection portions 8 of a fluid conveyance and/or distribution system, for example a piping system. The connection portions 7, 8 of the device 1 and of the piping system are connectable to each other due to one or more ring nuts 9 which can be coupled to one and screwed to the other of the connection portions 7, 8. By way of example, the ring nut 9 may comprise a shoulder 10 which engages a flange (not visible in the figures) of a pipe and an inner thread 11 that can be screwed on a corresponding outer thread of the tubular connection portion 7 of the device 1.

The device 1 further comprises a first adapter 12 comprising a valve coupling portion 13, a driving portion 14 and a first key seat 15. The valve coupling portion 13 is adapted to be received and supported by the tightening seat 16 in a tightening position and rotatable around a tightening axis 17. The driving portion 14 is configured to engage, in the tightening position, with an engagement portion 18 formed in the ring nut 9 or connected thereto, so that a rotation of the first adapter 12 around the tightening axis 17 causes, depending on the direction of rotation, a screwing or unscrewing of the ring nut 9. The first key seat 15 is shaped to receive a coupling portion 19 (for example a square coupling) of a tightening tool so as to rotate the first adapter 12 in the tightening position around the tightening axis 17.

Due to the engagement between the first adapter 12 in tightening position and the ring nut 9, the latter can be tightened or loosened (at least in the final screwing section on the connection portion 7) by means of a tightening tool, in particular a dynamometric key 20, thus overcoming the need of grasping the ring nut manually and thus allowing an easy mounting and dismounting with reproducible and variable tightening torques.

The device 1 can be controlled or regulated manually (for example a valve for regulating a liquid flow) and comprises a control seat 21 adapted to removably support the control handle 4 in a control position and rotatable around a control axis 22.

According to an embodiment, the tightening seat 16 is arranged near the control seat 21 so as to allow the unscrewing and the screwing of the ring nut 9 and the controlling of the device 1 from one side of the housing 2.

The tightening seat 16 and the control seat 21 can be substantially coaxial and/or formed by the same common seat 16 and, advantageously, configured so that the control axis 22 and the tightening axis 17 coincide at least approximately, preferably entirely.

The tightening 16 and/or control 21 seats can comprise a substantially annular wall or a pin formed in the housing 2 and adapted to rotatably receive and support the corresponding valve coupling portion 13 (for example annular, tubular or cylindrical) of the first adapter 12 and also a connection portion of the control handle 4.

During a maintenance intervention it is thus sufficient to detach the control handle 4 from common control 21 and tightening 16 seat and applying the first adapter 12 to such seat to unscrew or screw the ring nut by means of the tightening tool.

According to an embodiment, the engagement portion 18 of the ring nut 9 comprises a toothed crown 24 and the driving portion 14 of the first adapter 12 comprises a toothed section which engages with the toothed crown 24 when the first adapter 12 is in tightening position and the ring nut 9 is at least screwed partly.

The toothed crown 24 can be advantageously formed in a front edge 25 of the ring nut 9 facing towards the tightening seat 16.

According to an embodiment, the driving portion 14 of the first adapter 12 comprises a partitioned tooth section 23 so as to provide, together with the toothed crown 24 of the ring nut 9, a sector screwing and unscrewing engagement suitable to operate on only one of the ring nuts, while the position of the other ring nut remains unvaried.

According to a further embodiment, the device 1 may comprise one or more fastening rings 26 which can be screwed into the tubular connection portions 7 to ensure the positioning of internal components of the device 1, for example gaskets and the shutter 3 in the case of a ball valve.

In order to allow an easy, reproducible and verifiable screwing and tightening of the fastening rings 26 a second adapter 27 comprising a mounting portion 28 and a second key seat 30 can be provided for. The mounting portion 28 is adapted to rotatably integrally engage a tool seat 29 formed in the fastening ring 26 so that a rotation of the second adapter 27 coupled to the tool seat 29 causes, depending on the direction of rotation, a screwing or unscrewing of the fastening ring 26. The second key seat 30 is adapted to rotatably integrally receive the coupling portion 19 of the tightening tool to rotate the second adapter 27.

Advantageously, the mounting portion 28 is configured to engage both the tool seat 29 of the fastening ring 26 and a wall of the tubular connection portions 7, with the aim of self-aligning and stabilising the second adapter 27 during the mounting and dismounting of the fastening rings 26.

According to an embodiment, the mounting portion 28 comprises a radially internal protrusion 31 adapted to lie against an internal surface of the fastening ring 26 and one or, preferably, two radially external protrusions 32 opposite to each other and adapted to be inserted into special recesses 33 formed in the fastening ring 26.

Advantageously, the internal protrusion 31 has a circular shape substantially complementary with the circular internal surface (preferably cylindrical) of the fastening ring 26 and adapted to align the internal protrusion 31 coaxially with the fastening ring 26.

The external protrusions 32 may have a base 34 with a first radial thickness and an end portion 35 connected to the base 34 by means of a step 36 and having a second radial thickness smaller than the first radial thickness of the base 34. Analogously, the recesses 33 of the fastening ring 26 may have a shape with step complementary to the shape of the external protrusions 32 of the second adapter 27. Such configuration reinforces the external protrusions 32 of the second adapter (which can be made of plastic material) and provides an integral shape-coupling in rotation suitable to transmit high torques without breaking neither the fastening ring nor the mounting portion of the second adapter.

The first key seat 15 of the first adapter 12 and the second key seat 30 of the second adapter 27 preferably have an identical shape, for example a square or hexagonal cavity suitable for integral shape-coupling in rotation.

As outlined previously, the device 1 or an assembly kit of the device 1 may also comprise a dynamometric key 20 having a coupling portion 19 adapted to rotatably integrally engage the first key seat 15 of the first adapter 12 and also the second key seat 30 of the second adapter 27, as well as a dynamometric control mechanism 37 adjustable to a first torsional value for tightening the ring nut 9 and a second torsional value for tightening the fastening ring 26.

The control mechanism 37 may be received in a handgrip 38 of the dynamometric key 20 and it may comprise a spring whose preload adjustable by means of a knob determines the fastening value. The coupling portion 19 is rotatably hindered with respect to the handgrip 38 by a tooth kept in position by a ball against the head of the spring. Upon reaching the set fastening value, the ball lowers due to the yielding of the counter spring and the tooth disengages the coupling portion 19 which is thus freed and a characteristic snapping is heard.

The device 1 allows using only one tightening tool, in particular of the dynamometric key, for tightening the ring nuts and also for tightening the fastening rings, for example of a ball valve. This allows an easy assembly of the single components of the device with reproducible and verifiable fastening torques regardless of the particular shape of the components and unfavourable space conditions.

According to a further embodiment, the first adapter 12 and the second adapter 27 are integrated in a single first adapter comprising, besides the previously described characteristics, also the mounting portion adapted to engage the tool seat 29 formed in the fastening ring 26 so that a rotation of the single first adapter engaged in the tool seat causes, depending on the direction of rotation, a screwing or unscrewing of the fastening ring 26.

According to a further embodiment, at least one of the first, second or single first adapter also forms the control handle 4.

In this embodiment, the control seat 21 and the control handle 4 are configured so that:

in the control position, the control handle 4 does not engage with the engagement portion 18 of the ring nut 9 and instead interacts with the device 1, for example with the actuation shaft 5 and the shutter 3, so that a rotation of the control handle 4 around the control axis 22 affects the passage of fluid through the device 1;

in the tightening position, a rotation of the control handle 4 around the tightening axis 17 does not affect the passage of fluid.

This allows the use of the control handle 4 both to tighten and loosen the ring nuts 9 by means of a further tightening tool, in particular the dynamometric key 20, and to control the device 1, depending on the position of application thereof on the device 1, without the two functions of the handle 4 affecting each other.

Alternatively, the adapters and the control handle are distinct and separate components with respect to each other.

With particular reference to the exemplifying embodiment illustrated in the attached figures, the device 1 comprises two opposite tubular connection portions 7 and the tightening seat 16 is arranged centrally between the two connection portions 7, so that the first adapter 12 in tightening position allows the tightening and the loosening of both ring nuts 9 associated to the two connection portions 7.

The device 1 and all the components thereof or the components of the assembly kit, except for the dynamometric key 20, can be provided at least partly, preferably entirely made of synthetic material, for example polymeric material.

The invention described up to now allows the implementation of a method for assembling a fluid conveyance and/or distribution device of the type comprising a housing forming one or more tubular connection portions removably connectable with corresponding connection portions of a fluid conveyance and/or distribution system, as well as one or more threaded ring nuts which can be screwed to respectively one of the connection portions for joining said connection portions, wherein such method comprises the steps of:

providing a first adapter having a valve coupling portion, a driving portion adapted to engage an engagement portion formed in the ring nut and a first key seat adapted to receive a portion for coupling the dynamometric key to rotate the first adapter, rotatably connecting the first adapter by means of the valve coupling portion to a tightening seat of the valve housing, engaging the first key seat of the first adapter by means of a dynamometric key and rotating the dynamometric key for screwing the ring nut, verifying the tightening torque during the screwing of the ring nut by means of the dynamometric key.

The method may further comprise the steps of:

ensuring the positioning of internal components of the device by means of screwing at least one fastening ring in the tubular connection portions, providing a second adapter having a mounting portion adapted to engage a tool seat formed in the fastening ring and a second key seat adapted to receive a portion for coupling the dynamometric key, applying the second adapter by means of the mounting portion to the tool seat of the fastening ring, engaging the second key seat of the second adapter by means of the dynamometric key and rotating the dynamometric key to tighten the fastening ring, verifying the tightening torque during the tightening of the fastening ring by means of the dynamometric key.

Obviously, the device 1, the assembly kit and the method according to the present invention may be subjected—by a man skilled in the art and with the aim of meeting contingent and specific needs—to further modifications and variants, all falling within the scope of protection of the invention, as defined by the attached claims.

What is claimed is:

1. Device for conveying and/or distributing fluids, comprising:
   a housing with a tightening seat and one or more tubular connection portions that are removably connectable with corresponding connection portions of a fluid conveyance and/or distribution system,
   one or more threaded ring nuts adapted to be screwed to said connection portions, said ring nut having an engagement portion which forms a ring gear,
   one or more fastening rings adapted to be screwed into the tubular connection portion to ensure the positioning of internal components of the device, and
   a first adapter comprising:
      A) a valve coupling portion adapted to be supported by the tightening seat in a tightening position allowing rotation of the first adapter with respect to the housing around a tightening axis,
      B) a drive portion which forms a toothed section, wherein, when the first adapter is supported by the tightening seat in the tightening position and the ring nut is at least partially screwed on the connection portion, the toothed section of the first adapter engages with the ring gear of the ring nut and a rotation of the first adapter with respect to the housing around the tightening axis causes a screwing or unscrewing of the ring nut, depending on the first adapter rotation direction,
      C) a first key seat for coupling of a tightening tool for rotating the first adapter in the tightening position with respect to the housing around the tightening axis, and
   a second adapter comprising:
      D) a mounting portion adapted to torsionally engage a tool seat of the fastening ring,
      E) a second key seat for coupling of the tightening tool for rotating the second adapter.

2. Device according to claim 1, comprising a control seat adapted to support a control handle in a detachable manner in a control position allowing rotation of the control handle with respect to the housing around a control axis for the manual regulation of the flow of the fluid, wherein said tightening seat is arranged near the control seat.

3. Device according to claim 2, wherein the tightening seat and the control seat are coaxial and the control axis is identical with the tightening axis.

4. Device according to claim 1, wherein the toothed section of the drive portion is shaped to operate on only one of the ring nuts at a time.

5. Device according to claim 1, wherein the mounting portion comprises a first protrusion adapted to lie against an internal surface of the fastening ring and two second protrusions adapted to be inserted into corresponding recesses formed in the fastening ring.

6. Device according to claim 5, wherein the first protrusion has a circular shape complementary with the circular internal surface of the fastening ring, so as to align the first protrusion coaxially with the fastening ring.

7. Device according to claim 5, wherein the second protrusions have a base with a first radial thickness and an end portion connected to the base by means of a step and having a second radial thickness smaller than the first radial thickness of the base and wherein the recesses of the fastening ring have a shape with step complementary to the shape of the external protrusions of the second adapter.

8. Device according to claim 1, wherein the first key seat of the first adapter and the second key seat of the second adapter have an identical shape.

9. Device according to claim 1, comprising a dynamometric key having a coupling portion adapted to rotatably integrally engage the first key seat of the first adapter and the second key seat of the second adapter, as well as a dynamometric control mechanism adjustable to a first torsional value for tightening the ring nut and a second torsional value for tightening the fastening ring.

10. Device according to claim 1, wherein said device is a ball valve.

11. Method for assembling a fluid conveyance and/or distribution device of the type comprising:
    a housing with a tightening seat and one or more tubular connection portions that are removably connectable with corresponding connection portions of a fluid conveyance and/or distribution system,
    one or more threaded ring nuts adapted to be screwed to said connection portions, said ring nut having an engagement portion which forms a ring gear,
    one or more fastening rings adapted to be screwed into the tubular connection portion to ensure the positioning of internal components of the device,
    the method comprising the steps of:
    providing a first adapter having a valve coupling portion, a driving portion adapted to engage an engagement portion formed in the ring nut and a first key seat adapted for coupling with a dynamometric key for rotating the first adapter,
    rotatably connecting the first adapter by means of the valve coupling portion to the tightening seat of the housing,
    engaging the first key seat of the first adapter by means of the dynamometric key and rotating the dynamometric key for rotating the first adapter with respect to the housing and thereby screwing the ring nut,
    verifying the tightening torque during the screwing of the ring nut by means of the dynamometric key,
    providing a second adapter having a mounting portion adapted to engage a tool seat formed in the fastening ring and a second key seat for coupling with the dynamometric key,
    applying the second adapter by means of the mounting portion to the tool seat of the fastening ring,
    engaging the second key seat of the second adapter by means of the dynamometric key and rotating the dynamometric key for rotating the first adapter with respect to the housing and thereby tighten the fastening ring, and
    verifying the tightening torque during the tightening of the fastening ring by means of the dynamometric key.

12. Device for conveying and/or distributing fluids, comprising:
    a housing with a tightening seat and one or more tubular connection portions that are removably connectable with corresponding connection portions of a fluid conveyance and/or distribution system, one or more threaded ring nuts adapted to be screwed to said connection portions said ring nut having an engagement portion which forms a ring gear, one or more fastening rings adapted to be screwed into the tubular connection portion to ensure the positioning of internal components of the device, and a first adapter comprising:
- A) a valve coupling portion adapted to be supported by the tightening seat in a tightening position allowing rotation of the first adapter with respect to the housing around a tightening axis,
- B) a drive portion which forms a toothed section, wherein, when the first adapter is supported by the tightening seat in the tightening position and the ring nut is at least partially screwed on the connection portion, the toothed section of the first adapter engages with the ring gear of the ring nut and a rotation of the first adapter with respect to the housing around the tightening axis causes a screwing or unscrewing of the ring nut, depending on the first adapter rotation direction,
- C) a first key seat for coupling of a tightening tool for rotating the first adapter in the tightening position with respect to the housing around the tightening axis, and
- D) a mounting portion adapted to torsionally engage a tool seat of the fastening ring wherein a rotation of the first adapter with respect to the housing causes a screwing or unscrewing of the fastening ring, depending on the first adapter direction of rotation.

\* \* \* \* \*

UNITED STATES PATENT AND TRADEMARK OFFICE
CERTIFICATE OF CORRECTION

PATENT NO.        : 8,726,927 B2  
APPLICATION NO.   : 13/291724  
DATED             : May 20, 2014  
INVENTOR(S)       : Andrea Bisio et al.

Page 1 of 1

It is certified that error appears in the above-identified patent and that said Letters Patent is hereby corrected as shown below:

On the title page, Item (73), Assignee, change "FIP Formatura Iniezone Polimeri, S.p.A." to
-- FIP Formatura Iniezione Polimeri, S.p.A. --

Signed and Sealed this  
Twenty-fourth Day of March, 2015

Michelle K. Lee  
*Director of the United States Patent and Trademark Office*